(12) United States Patent
Eddings et al.

(10) Patent No.: US 10,805,427 B1
(45) Date of Patent: Oct. 13, 2020

(54) BACKUP AND RESTORE OF CUSTOMER DEVICES

(71) Applicant: Sprint Communications Company L.P., Overland Park, KS (US)

(72) Inventors: Justin Eddings, Eudora, KS (US); Alice M. Kingsolver, Gardner, KS (US); John D. Sumler, Bonner Springs, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1273 days.

(21) Appl. No.: 15/001,785

(22) Filed: Jan. 20, 2016

(51) Int. Cl.
*H04L 29/08* (2006.01)
*G06F 8/61* (2018.01)
*G06F 11/14* (2006.01)

(52) U.S. Cl.
CPC ............ *H04L 67/34* (2013.01); *G06F 8/61* (2013.01); *G06F 11/1464* (2013.01); *H04L 67/1097* (2013.01); *G06F 2201/80* (2013.01)

(58) Field of Classification Search
None
See application file for complete search history.

(56) References Cited

U.S. PATENT DOCUMENTS

| | | | | |
|---|---|---|---|---|
| 7,409,208 B1* | 8/2008 | Clare | ................. | G06F 8/61 455/419 |
| 8,468,164 B1* | 6/2013 | Paleja | ................. | G06F 16/9535 707/767 |
| 8,764,555 B2* | 7/2014 | Quan | ................. | A63F 13/10 463/24 |
| 9,600,552 B2* | 3/2017 | Quan | ................. | H04L 67/1095 |
| 9,654,897 B1* | 5/2017 | Macaluso | ............ | G06Q 20/085 |
| 9,769,258 B1* | 9/2017 | Kay | ................. | H04L 67/1095 |
| 2004/0199756 A1* | 10/2004 | Graves | ................. | G06F 9/5061 713/1 |
| 2008/0147745 A1* | 6/2008 | Wilkinson | ............ | H04L 67/16 |
| 2012/0096364 A1* | 4/2012 | Wilkinson | ........... | H04L 67/1008 715/740 |
| 2013/0007499 A1* | 1/2013 | Moy | ................. | G06F 3/1423 713/400 |
| 2013/0041959 A1* | 2/2013 | Bengtsson | .............. | H04L 51/14 709/206 |

(Continued)

*Primary Examiner* — Mariela Reyes
*Assistant Examiner* — Edward Jacobs

(57) ABSTRACT

A method of consolidating user actions across a plurality of electronic devices. The method comprises receiving information from each of a plurality of electronic devices associated with a common user, where the receiving is performed by a consolidation application executing on a server computer, and analyzing the information by the consolidation application. The method further comprises identifying by the consolidation application a first application installed on a first one of the electronic devices, based on a plurality of mappings of related applications to different compatible electronic devices, determining that a second application related to the first application is compatible with a second one of the electronic devices, and sending a message to the second one of the electronic devices that suggests that the second application be installed on the second one of the electronic devices, whereby a user installs the second application on the second one of the electronic devices.

20 Claims, 9 Drawing Sheets

(56) References Cited

U.S. PATENT DOCUMENTS

| | | | |
|---|---|---|---|
| 2013/0332607 A1* | 12/2013 | Santamaria | G06F 15/173 709/225 |
| 2014/0135105 A1* | 5/2014 | Quan | H04L 67/1095 463/24 |
| 2014/0306863 A1* | 10/2014 | Moy | H04L 67/148 345/1.3 |
| 2015/0229703 A1* | 8/2015 | Merkel | H04L 67/42 709/203 |
| 2015/0243246 A1* | 8/2015 | Mun | G06F 9/44505 345/520 |
| 2015/0381754 A1* | 12/2015 | Zhao | G06F 3/0484 709/219 |
| 2016/0173591 A1* | 6/2016 | Gupta | G06F 8/00 709/217 |
| 2016/0294916 A1* | 10/2016 | Daher | H04L 51/08 |
| 2016/0330251 A1* | 11/2016 | Lee | G06F 9/54 |

* cited by examiner

US 10,805,427 B1

BACKUP AND RESTORE OF CUSTOMER DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network capable electronic devices are becoming increasingly prevalent in our daily lives. More and more electronic devices that did not have network capabilities are now built to be network capable. Customers may benefit from transferring content and applications from one network capable electronic device to another either because they upgrade from a less advanced device to a more advanced device or because they have more than one device and would like to have the same content and applications on those devices.

SUMMARY

In an embodiment, a method of consolidating user actions across a plurality of electronic devices of a common user is disclosed. The method comprises requesting and receiving information from each of a plurality of electronic devices associated with a common user, wherein the information comprises device type identity, device model identity, installed application identities, device settings, and states of installed applications, where the requesting and receiving is performed by a consolidation application executing on a server computer. The method further comprises analyzing the information received from the plurality of electronic devices by the consolidation application; based on analyzing the information, synchronizing by the consolidation application an action performed on one of the electronic devices with another one of the electronic devices; and based on analyzing the information, identifying by the consolidation application a first application installed on a first one of the electronic devices. The method further comprises, based on a plurality of mappings of related applications to different compatible electronic devices, determining by the consolidation application that a second application related to the first application is compatible with a second one of the electronic devices and sending a message to the second one of the electronic devices by the consolidation application, where the message suggests that the second application be installed on the second one of the electronic devices, whereby a common user installs the second application on the second one of the electronic devices.

In another embodiment, a user equipment (UE) that periodically stores state in a remote data store is disclosed. The UE comprises a cellular radio transceiver, a processor, a non-transitory memory, and a back-up application stored in the non-transitory memory. When executed by the processor the back-up application collects UE data selected from two or more of device pairing data, alarm setting data, mobile application state data and transmits the collected UE data periodically to a remote data store via the cellular radio transceiver, whereby the UE data can be installed on a different UE.

In yet another embodiment, a method of migrating at least one mobile application from a first user equipment (UEs) to a second UE is disclosed. The method comprises analyzing by a server computer usage of mobile applications installed on user equipments (UEs) according to UE model and determining a plurality of mappings based on the analysis of usage of mobile applications, where each mapping maps a first application installed on a first UE model to a second application installed on a second UE model where the first UE model and the second UE model are different models. The method further comprises receiving a request to install a mobile application on the second UE, where the request identifies a UE model of the first UE, identifies at least one mobile application installed on the first UE, and identifies a UE model of the second UE, identifying a mobile application based on the plurality of mappings, based on the at least one mobile application installed on the first UE, based on the UE model of the first UE, and based on the UE model of the second UE, and causing the mobile application that is identified based on the plurality of mappings to be installed on the second UE.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
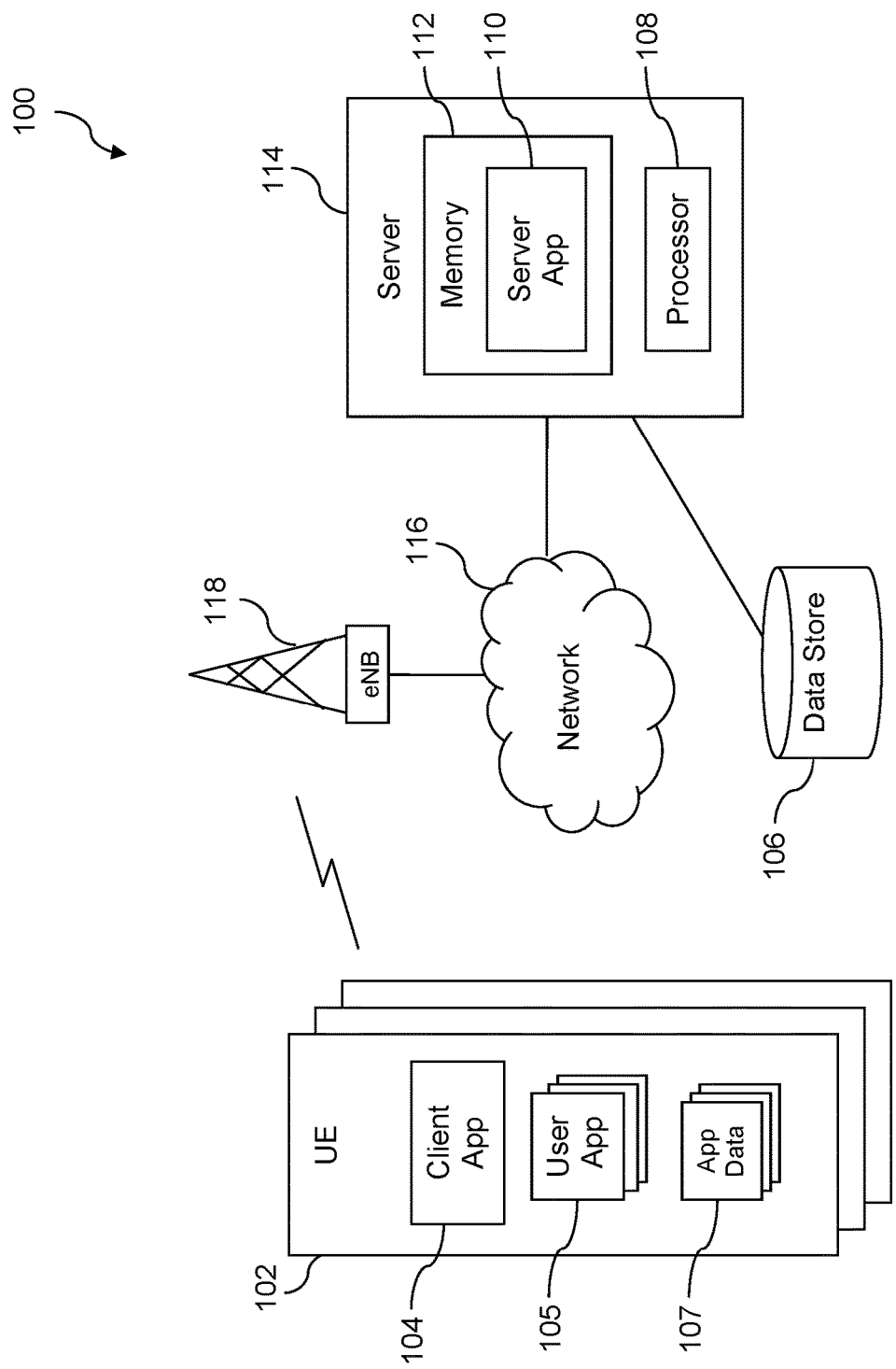
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a user equipment (UE) such as a smart phone is lost or stolen, settings, applications, application data, content, contacts, text message history, and/or call logs stored on the UE typically will be lost with the UE. When a user upgrades his or her old UE to a newer model, the user may spend hours transferring content manually from the old UE to the new UE, downloading applications, and/or setting up the new UE. Content, contacts, text message history, call logs, messages, alarms, applications, application data, game progress, settings, and/or another type of data is usually not transferred automatically from one UE to another UE, especially not from one operating system platform to another operating system platform. The content may comprise photos, images, videos, personal notes, downloads, or some other content. The settings of a UE may comprise application settings, operating system settings, device pairings, established links for email, Bluetooth® settings, and/or another type of setting. The reason may be that no standards have been established for how and where to store application settings or how to transfer files between different operating system platforms or even between different versions of the same operating system platform.

A mechanism to automatically back up, transfer, and/or restore data between UEs or customer devices may be beneficial to users. The source UE and the target UE for data transfer may be two instances of the same model of UEs, different models of UEs that share the same operating system platform, or different UEs that comprise different operating system platforms. The present disclosure teaches a system and method for backing up and restoring customer devices. The present disclosure further teaches using that system and method for other related purposes such as consolidating user actions across a plurality of electronic devices belonging to or employed by the same user. Said in other words, the system taught herein may be used for restoring a state of a lost device on a replacement device, transferring state from a disused device ("old" device) to a replacement device, and/or for sharing, synchronizing, and consolidating a user's actions across his or her electronic devices.

For example, the user may develop an interest in speed chess (a.k.a., fast chess, blitz chess) and install a speed chess application on her mobile phone. The system may determine that a different speed chess application that is compatible with the user's tablet computer is available, present a recommendation or notification to the user that she may enjoy playing speed chess on her tablet computer, and offer an easy installation interface for installing speed chess on her tablet computer. After installing speed chess on her tablet (it is understood that the system may promote or broker the installation of the speed chess application or the user may install the speed chess application on her tablet computer independently of the system), the system may update both of the related but different speed chess applications (related in being each applications that support playing speed chess electronically, different in being targeted to execute on different execution platforms) with a player rating of the user as she progresses in her mastery of speed chess. Speed chess game histories captured on one electronic device may be transcoded and copied over by the system to the other electronic device and made available through the speed chess application on the other electronic device.

For example, a server application may be stored in a memory of a server. The server may be maintained by a wireless communication service provider. When executed by a processor of the server, the server application may perform a variety of functions to back up and restore customer devices. The server application may also support consolidating user actions on a plurality of commonly owned or used electronic devices and/or UEs. For example, when data is received by the server from a first UE, the received data may be stored by the server to a data store. The data store may be maintained by the server. The data from the first UE may be transmitted by a client application on the first UE. A window may be triggered by the client application to pop up on the UE for a user of the first UE to choose which data to be transmitted to the server or the server application. This window may automatically pop up during activation of a new UE or not long after the new UE is activated (an hour after initial activation, a day after initial activation, a week after initial activation, or after some other brief period of delay). This window may automatically pop up during or after installation of a new application on a UE. The window may also allow the user to choose a frequency for the chosen data to be transmitted from the UE to the data store. In other words, the chosen data may be backed up in the data store at a frequency chosen by the user. Types of the received data may comprise content, contacts, text message history, call logs, messages, alarms, applications, application data, game progress, settings, and/or another type of data.

The server application may request a credential from the user under predefined circumstances, for example upon a request to download the stored data to a second UE. For example, when the user purchases a new UE or when the first UE is lost, it may be efficient for the second UE to download data of the first UE that is stored on the data store. In some contexts the first UE may be referred to as the disused UE and the second UE may be referred to as the replacement UE. Alternatively, the server application may request a credential from the user when a request to store data into a data store is received from the UE. The credential may be a key for the UE and/or an identification of a user. For example, the user identification may be a Google account and password, an Apple ID and password, an account with a wireless communication service provider and the associated password, or some other type of user identification. A fingerprint of the user may be requested with the credential to validate the identification of the user, for example for data of higher level security. When the credential has been validated, the server may transmit the stored data from the data store to the requesting UE or initiate a process of uploading data from the requesting UE to the data store.

The server application may analyze current and previous applications, content, and/or another type of data on more than one UE that the user has owned. For example, the user may have owned multiple smart phones, laptops, tablets, or another type of UE throughout the time. These UEs may comprise various data such as applications, settings, and/or content. Some applications may have been downloaded to more than one of the UEs the user has owned and may be among the favorite applications of the user.

Some content may have been used often by the user, for example being edited, uploaded to social media, and/or transmitted to other devices more than once. The server application may determine well-liked applications, settings, and/or content among the data in the current and previous UEs that the user has owned. The server application may combine or aggregate the well-liked applications, settings, and/or content from the current and previous UEs that the user has owned. The server application may generate a list of recommended applications based on the analysis and/or aggregation. The server application may generate a list of recommended content based on the analysis and/or aggregation. The server application may provide the second UE with the generated list of recommended applications and/or content for the second UE to select from. When the credential has been validated, the server may transmit the selected applications and/or content from the previous UEs to the requesting UE In an embodiment, this may be performed during an activation process of the second UE. The activation process of a UE may occur when the UE is started for the first time after purchase. Activation may comprise associating a hardware identity of the UE (e.g., a mobile equipment identity (MEID), an electronic serial number (ESN), media access control (MAC) address, or another identity) to a mobile directory number (MDN) or phone number, for example provisioning the association into one or more data stores in the wireless service provider's network. Activation may comprise configuring the UE with operational settings such as preferred roaming lists (PRLs) and other radio access network (RAN) configuration settings. Activation may comprise associating a wireless communication service brand to an initially generic and/or unbranded UE and installing some or all of a set of branding elements onto the UE.

The stored data may be updated in the data store periodically based on the associated source data on the associated UE. In other words, the stored data may be synchronized with the associated source data on the source UE every week, every day, every six hours, every minute, or at some other periodic interval. The source data may be the original data on the source UE (which is related to the copy of data stored in the data store). The server application may ask the UE to choose a periodic interval to update the stored data in the data store. One copy of the stored data may be backed up by the server application in the data store every period of time to generate different versions of data backup for the source UE. For example, a data backup may be stored in the data store every week for possible system restoration of the source UE.

The source data on a source UE may be stored in standard and/or known memory locations within applications installed on the source UE or in standard and/or known memory locations in a settings area maintained by the operating system of the UE. Some source data may be stored in a memory area maintained by a client application on the UE. For example, applications that use a software development kit (SDK) of the subject UE for accessing computer resources of the UE and to install on the UE may use an application programming interface (API) of the UE to allocate memory in that memory area maintained by the client application and to write various source data associated with the application to that allocated memory. For example, a shooting game may periodically or on the event of terminating store a skill level attained by a player to a portion of memory allocated to that shooting game. The shooting game may periodically or on event store other information about game play. The information about game play may comprise values (e.g., skill level value) and an identity of the stored values. The information about game play may further comprise an identity of the application. The information may be stored in some standard format such as XML format. By storing this kind of information in an area of memory allocated and maintained on the UE by the client application (possibly allocated in response to an application invoking an API of the SDK when the application is installed), back-up and restore of source data may be simplified.

The server application may transmit a previous version of backup data to the source UE when a request is received from the source UE. In an embodiment, the source UE may request a previous version of backup data when important data has been deleted accidentally. The data may comprise content, contacts, text message history, call logs, messages, alarms, applications, application data, game progress, settings, and/or another type of data. The content may comprise at least one of photos, images, downloads, videos, and/or some other content. The settings may comprise application settings, operating system settings, device pairings, established links for email, Bluetooth® settings, and/or another type of setting. Device pairing is communicatively coupling an electronic device directly with another electronic device, where the device pairing may be effected through wireless communication. For example, a UE may be paired with a wireless speaker, a car, a media player, and/or another electronic device through Bluetooth®. Such device pairings can be established and maintained in the UE, for example as an internal configuration setting. Thus, by backing up device pairings, previous device pairing configurations may be reestablished without a user having to manually perform device pairing again, using the system and methods taught herein.

The server application may develop mappings of settings automatically based on a source UE, a source operating system platform of the source UE, a target UE, a target operating system platform of the target UE, history of user activities on the source UE, history of other users with the same model of UE as the target UE, the other users' satisfaction with UE migrations, and/or some other relevant factor. The source UE and the target UE may be different models of UEs that share the same operating system platform, meaning the source operating system platform is the same as the target operating system platform even though the versions of the starting and target operating system platforms may be different. Alternatively, the source operating system platform may be different from the target operating system platform. For example, one of the starting and target operating system platforms may be Android and the other may be iOS. The server application may store the settings of the source UE in a data store and transfer the settings from the data store to the target UE based on the mappings.

The server application may communicate with third parties, e.g. Amazon®, to make easier for users to migrate between devices. For example, Kindle eBooks already purchased by a subscriber of the wireless communication service provider may be automatically downloaded to a new UE that the subscriber purchased through the communication and/or cooperation of the server application and Amazon®. In an embodiment, the wireless communication service provider may keep a token for a UE or a user of the UE so that the wireless communication service provider may verify the identity of the UE or the user without asking the UE to input any credentials. The token may also be provided to the third party for verification of the identity of the UE or the user of the UE so that the UE may not be asked to input any credentials.

The server application may analyze most used applications on UEs of other users similar to a user of a subject UE. Users may be assigned to or partitioned to different user categories based on analysis. Users that are similar to the user of the subject UE may be referred to as being in the same category of users as the user of the subject UE. The subject UE may be a UE that requested data to be downloaded from the data store. The other similar users or users in the same user category may be users that share at least one interest. For example, a user that is interested in sports related applications may be similar to users that are also interested in sports related applications. The server application may generate a list of recommended applications and/or content based on the analysis and provide the subject UE with the generated list of recommended applications and/or content for downloading. Language interpretation may be used by the server application to analyze user reviews of applications that the user may be interested in, for example to decide on applications to recommend to the user of the subject UE.

Instead of downloading stored data from the data store, the client application or some other application on the second UE may initiate a short range wireless communication to transmit data directly from the first UE to the second UE when the first UE and the second UE are placed closely enough. The short range wireless communication protocols may comprise Bluetooth®, near-field communications (NFC), Wi-Fi direct, or some other short range wireless communication protocol. In an embodiment, the server application may verify that the first UE and the second UE are owned by the same user before the transmission of some data.

The server application that promotes storing settings and states of user devices, that promotes restoration of device settings and states during activation of a replacement device (either lost/stolen or updated), and that promotes consolidating across user devices (either in response to adding a new device or changing a state or setting of one of the devices) can execute periodically to pull information from a user's devices and/or can execute responsive to a triggering event, such as receipt of an update from a user device.

Turning now to FIG. 1, a communication system 100 is described. In an embodiment, the communication system 100 comprises a plurality of user equipments (UEs) 102, a server 114, and a data store 106. The UE 102 may alternatively be referred to in some contexts as a mobile communication device. The UE 102 may comprise a client application 104 and one or more user installed applications 105. The server 114 may comprise a processor 108 and a non-transitory memory 112. The non-transitory memory 112 may comprise a server application 110. The server 114 may be communicatively coupled to the data store 106.

It is understood that a plurality of UEs 102 may be associated with a single user, different UEs 102 at different times (e.g., an old or disused UE 102 last month or last year and a replacement or new UE 102 currently in use) and/or UEs 102 at the same time (e.g., a personal mobile phone and an employer supplied mobile phone). A plurality of different types of UEs 102 may be associated with a single user at the same time or different times, for example mobile phone, media player, laptop computer, tablet computer, set-top box, gaming system, and others. The UEs 102 may be associated with a user because the user both uses and owns the UEs 102. The UEs 102 may be associated with a user only because the user uses the UEs 102 but does not own the UEs 102 (a teenage child may use a UE 102 that is purchased and hence technically owned by the child's parents).

The UE 102 may be configured to use a radio transceiver to establish a wireless communication link with an enhanced Node B (eNB) 118, and the eNB 118 may communicatively couple the UE 102 to a network 116. The eNB 118 may alternatively be referred to in some contexts as a base transceiver station (BTS) or a cell tower. The server 114 and the data store 106 may also be communicatively coupled to the network 116. The network 116 may comprise any combination of private and public networks. Some UEs 102 (e.g., set-top box or gaming system) may be coupled to the network 116 by a wire, for example by a coaxial cable to a cable internet router in a private home.

It is understood that the system 100 may comprise any number of UEs 102, any number of data stores 106, any number of servers 114, and any number of eNBs 118. The collectivity of eNBs 118 may be said to comprise a radio access network (RAN), in that these eNBs 118 may provide a radio communication link to the UEs 102 to provide access to the network 116. The radio transceiver of the UE 102 may communicate with the eNB 118 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol.

While a smart phone is used in the role of UE 102 in some embodiments taught herein, at least some of the teachings of the present disclosure may also be extended to other network/communications capable devices such as a laptop computer, a notebook computer, a tablet computer, a personal digital assistant (PDA), a media player, a headset computer, a wearable computer, a game console, an Internet digital media streaming device, a television, a set-top box, a portable storage device, a hotspot, a 2.5 Wi-Fi translator, an Internet of Things (IoT) device, or another network/communications capable device. In an embodiment, the UE 102 may have other components (not shown) such as a near field communication (NFC) radio transceiver, a short range radio transceiver such as a wireless local area network radio transceiver, or other components.

The server 114 and the data store 106 may be server computers. The server 114 and the data store 106 may be located in one computer—for example a server computer, in two different computers—for example, a server computer for the server 114 and another computer for the data store 106, in multiple different computers—for example, multiple server computers for the server 114 and other multiple computers for the data store 106, or in some other combination of computers. When the server 114 and the data store 106 are not located in one computer, the server 114 and the data store 106 may share the same wired or wireless local area network. The data store 106 may be maintained and/or managed by the server 114 and the server 114 may be maintained by a wireless communication service provider.

State and/or activity histories of user applications 105 may be stored in standard and/or known memory locations within the user applications 105 installed on the UE 102 or in standard and/or known memory locations in a settings area maintained by the operating system of the UE 102. Alternatively, state and/or activity histories of user applications 105 may be stored in an application data memory block 107 that is allocated on the UE 102 by the client application 104. For example, user applications that use a software development kit (SDK) of the subject UE for accessing computer resources of the UE 102 and to install on the UE 102 may use an application programming interface (API) of the UE 102 to allocate memory in that application data memory block 107 maintained by the client application 104 and to write various data associated with the user application 105 to that allocated memory. Each user application 105 may then periodically or on event store state and/or user activity information or data into the application data memory block 107, for example a portion of the application data memory block 107 allocated specifically for that subject user application 105.

In an embodiment, the application data memory block 107 may comprise a queue data structure that user applications 105 write their state and/or user activity data to. As the client app 104 reads from the queue data structure and transmits back-up messages containing the subject state and/or user activity data to the data store 106 it removes the associated information from the queue, thereby avoiding the overflow of the application data memory block 107 or avoiding having to allocate excessive memory resources for use as the application data memory block 107.

For example, a shooting game may periodically or on the event of terminating store a skill level attained by a player to a portion of the application data memory block 107 allocated to that shooting game. The shooting game may periodically or on event store other information about game play to the portion of the application data memory block 107. The information about game play may comprise values (e.g., skill level value) and an identity of the stored values. The information about game play may further comprise an identity of the application. The information may be stored in some standard format such as XML format. By storing this kind of information in an area of memory allocated and maintained on the UE by the client application 104 (possibly allocated in response to a user application 105 invoking an API of the SDK when the application is installed), back-up and restore of source data may be simplified. The client application 104 may periodically or on event transmit the information stored by the shooting game user application 105 to the data store 106. While the example above indicates the state and/or user activity may be stored in the application data memory block 107, it is understood that the state and/or user activity may be stored in an area of memory allocated to the shooting game and accessible by the client app 104 or stored in a settings area maintained by an operating system of the UE 102.

The client app 104 may be stored in a memory of the UE 102. When executed by a processor of the UE 102, the client app 104 may perform a variety of functionality to back up and/or restore data of the UE 102. In some contexts, the client app 104 may be referred to as a back-up application, as a restore application, or as a back-up and restore application. For example, the data from the UE 102 may be transmitted by the client app 104 to the server 114 and/or the data store 106. A window may be presented by the client app 104 on a screen of the UE 102 for selection of data to be transmitted to the server 114. Backups may be performed at least in part, as delta backups. The user may also be asked to select a frequency, for example every hour, every eight hours, every day, or at some other periodic interval, to transmit data from the UE 102 to the server 114 for data backup. This may be the data backup frequency. The UE 102 may later download the stored data from the data store 106 under certain circumstances, for example when important data on the UE 102 has been accidentally deleted and/or when a second UE is to download data from a user's previous UE.

It is further understood, that the client app 104 may provide functionality that supports coordinating and/or consolidating state and user activity across a plurality of different UEs 102, for example coordinating and/or consolidating user actions across a mobile phone, a laptop computer, a tablet computer, and a gaming system. For example, a user may use the same user application 105 or related applications executing on different platforms or types of UE 102. For example, a user may play speed chess on her mobile phone (e.g., one of the user applications 105 may be a speed chess application configured for installation and execution on the specific model of mobile phone) while waiting in line to renew her driver's license at the department of motor vehicles and also play speed chess on her tablet computer (e.g., one of the user applications 105 installed on the tablet computer may be a speed chess application configured for installation and execution on the specific model of tablet computer) while sitting at her kitchen table at home in the evening. The client application 104 on these different types of UEs 102 may capture and transmit state information and/or activity information about her speed chess application use to the data store 106, and the server application 110 may transmit that information to the corresponding client application 104 on the different UE 102. The related applications on each UE 102 may use the received user state and/or activity information to update its corresponding state and activity history. This may be referred to as consolidating state across user electronic devices or UEs 102. This may be referred to as coordinating state across user electronic devices or UEs 102. The server application 110 may be referred to in some contexts as a consolidation application.

It is understood that a related application provides functionality similar to the application which it is deemed related to, but the related application may be developed or configured for execution in a different execution environment, for example in a different operating system, on a different processor, in a different environment having different hardware resources available. As an example, a first speed chess application configured for execution on an Android mobile phone is different from a second speed chess application configured for execution on a tablet computer on top of a Windows operating system. Notwithstanding, these user applications 105 may be considered related because they deliver similar functionality—supporting a user playing speed chess—and can be expected to support at least some stateful parameters in common such as a speed chess player skill level and speed chess game histories. It is understood that there are a wide variety of types of related user applications 105, for example navigation applications, social networking applications, newsfeed applications, airplane reservation and flight status applications, gaming applications, and yet other examples.

The client app 104 may offer options for different times to backup data on the UE 102, for example shortly after the selection of types of data, when the UE 102 has access to Wi-Fi, and/or when the UE 102 is in an idle state. The client app 104 may offer priority classification of selected types of data for backup. For instance, data types with higher priority may be backed up shortly after the selection of types of data or shortly after data backup initiation by the user while the rest of the data types selected for backup—without higher priority—may be transmitted to the data store 106 at a later time when the UE 102 is idle. The client 104 may share application state When the UE 102 requests to download data from the data store 106, the identity of the UE 102 or a user of the UE 102 may be verified by the server 114. The UE 102 may request to download data from the data store 106 by transmitting a request message. When the identity of the UE 102 or the identity of the user of the UE 102 has been verified by the server 114, the client app 104 or some other application on the UE 102 may download the stored data from the data store 106. Alternatively, when the first UE and the second UE are placed physically closely enough, instead of downloading the stored data from the data store 106, the client app 104 on the second UE may initiate a short range wireless communication for the first UE to transfer data to the second UE. The short range wireless communication protocol may be any of Bluetooth®, near-field communications (NFC), Wi-Fi direct, or another short range wireless communication protocol. The server app 110 or the client app 104 may verify that the first UE and the second UE are owned by the same user before the data may be transferred from the first UE to the second UE.

The server app 110 may be stored in the memory 112. When executed by the processor 108, the server app 110 may perform a variety of functionality to back up and/or restore data for UEs 102. For example, the server app 114 may communicate with a client app 104 of a UE 102, verify the identity of a UE 102, verify the identity of a user of the UE 102, store data from the UE 102 to the data store 106, analyze data on UEs 102 that the same user has owned, analyze data of UEs 102 of other users similar to the user, generate a list of recommended applications for the UE 102 to download based on the analysis, generate a list of recommended data for the UE 102 to download, map settings between different UEs 102, transmit data to the UE 102 after the identity of the UE 102 has been verified, and/or perform another function to back up or restore data for UEs 102.

For example, when data is received by the server 114 from a UE 102, the received data may be stored by the server app 110 to the data store 106. The data from the UE 102 may be transmitted by the client app 104 on the UE 102. In an embodiment, types of the received data may comprise content, contacts, text message history, call logs, messages, alarms, applications, application data, game progress, settings, and/or another type of data. The content may comprise photos, images, videos, personal notes, downloads, and/or some other content. The settings of a UE may comprise application settings, operating system settings, device pairings, established links for email, Bluetooth® settings, and/or another type of setting.

The stored data may be updated in the data store 106 periodically based on the associated source data on the UE 102. In other words, the stored data in the data store 106 may be synchronized with the source data on the UE 102 periodically. For example, the stored data may be synchronized with the associated source data on the UE 102 every week, every day, every six hours, every minute, or at some other periodic interval. As discussed above, the client app 104 may ask the UE 102 choose a periodic interval to update the stored data in the data store 106. Copies of the stored data may be periodically stored as various versions of data backup for the UE 102 in the data store 106.

Each version may be stored with a timestamp and/or a version number. The different versions of the backup data may benefit the UE 102 in cases of data restore. For example, a version of backup data may be stored in the data store 106 every day for a possible operating system restoration of the UE 102. Data backup generated at a specific date may be chosen for an operating system restoration. The server app 110 may transmit a selected version of backup data to the UE 102 when a request is received from the UE 102. For example, the UE 102 may request to download a previous version of backup data when important data has been deleted accidentally.

The server app 110 may request a credential from the UE 102 under predefined circumstances, for example upon the receipt of a request from the second UE for downloading the data stored in the data store 106. For example, when the user purchases a new second UE or when a first UE is lost, it may be beneficial for the second UE to download files from the first UE that are stored on the data store 106. For instance, files from the first UE that are stored on the data store 106 may be downloaded to the second UE during an activation process of the second UE. Alternatively, the server app 110 may request a credential from the UE 102 when a request to store data into a data store is received from the UE 102. For example, the client app 104 may offer an option for the UE to backup data into the data store 106. The credential may be a key for the UE 102 and/or an identification of a user of the UE 102 that requests data uploading to or data downloading from the data store 106. For example, the user identification may be a Google account and password, an Apple ID and password, an account with a wireless communication service provider and the associated password, or some other type of user identification.

A fingerprint of the user may be requested with the credential to further validate the identification of the user, for example for data downloading request of higher security level. When the credential of the UE 102 is verified, the server app 110 or the server 114 may transmit the requested data to the UE 102; otherwise, the server app 110 may decline the request of the UE 102. While the new UE is in progress of downloading data from the data store 106, the client app 104 may present a relevant advertisement on the screen of the UE. For example, the advertisement may promote accessories for the new UE.

The server app 110 may analyze currently installed user applications 105, content, and/or another type of data on more than one UE 102 that the user has owned. Additionally, the server app 110 may analyze previously installed applications 105 (e.g., user applications 105 that were installed on disused or old UEs 102, where a related application may not have been installed in a replacement or new UE 102), content, and/or another type of data on the more than one UE that the user has owned. For example, the user may have owned multiple smart phones, laptops, tablets, etc. in the past five years and the server app 110 may analyze relevant data on those UEs. A variety of data on these UEs may be included into a recommendation list for a subject UE 102 by the server app 110. The subject UE 102 may be the UE that requested to download data from the data store 106. For example, a user who installed a speed chess application on a disused UE 102 may be interested in installing a related speed chess application on a replacement UE 102.

For example, some applications may have been downloaded to more than one of these UEs and thus may be among the favorite applications of the user. Some content may have been used often by the user, for example being edited, uploaded to social media, and/or transmitted to other devices more than once. The server app 110 may determine well-liked applications, settings, and/or content among the data in the current and previous UEs that the user has owned. The server app 110 may combine or aggregate the well-liked applications, settings, and/or content from these current and previous UEs. The server app 110 may generate a list of recommended applications based on the analysis and/or aggregation. The server app 110 may generate a list of recommended content based on the analysis and/or aggregation. The server application may provide the subject UE with the generated list of recommended applications and/or content for the subject UE to select from. When the credential of the subject UE has been validated, the server app 110 may transmit the selected applications and/or content to the subject UE.

The server app 110 may further analyze most used applications on UEs of users similar to the user of the subject UE 102. The users similar to the user may be users that share at least one interest with the user. For example, a user that is interested in sports related applications may be considered a similar user to users that are also interested in sports related applications. The server app 110 may generate a list of recommended applications for a UE 102 to download based on the analysis. For example, when a user upgrades from a less advanced first UE to a more advanced second UE, the second UE may be configured to download data from the data store 106. The server app 110 may transmit stored data from the first UE to the second UE after the identification of the second UE has been verified while also generate a list of recommended applications based on the analysis of UEs with users that are similar to the user of the second UE. Alternatively, some of this processing may be triggered and/or performed during an activation that is performed, at least in part, by a user who may have received the second UE through web-based sales and may rely on an activation process that is at least partly a hands-free activation process.

Some parts of the above processing and/or functionality may be triggered by and/or performed during an activation of the second new UE. For example, when the second new UE is activated in a retail store, the server app 110 may analyze data on UEs 102 that the user of the second UE has owned, analyze data of UEs 102 of other users similar to the user, generate a list of recommended applications for the second UE to download based on the analyses, generate a list of recommended data for the second UE to download, map settings between the first UE and the second UE, and/or transmit data to the second UE after the identity of the second UE has been verified.

In an embodiment, a user application 105 that is identified or associated with the user of the UE 102 in the data store 106 from the first UE may be found to be incompatible with the second UE, for example when the second UE comprises a different version of an operating system platform from the first UE or when the second UE comprises a different operating system platform from the first UE. A closest match of the user application 105 (e.g., the closest matching related application) may be recommended by the server app 110. For example, a different version of the same application may be recommended by the server app 110 for the second UE to download. The recommended application may be an updated version of speed chess for execution on the same general UE platform or operating system. Alternatively, the recommended application may be a speed chess application that is configured for execution on a different UE platform and may, possibly, be an older version of speed chess, because no later version of the speed chess application is available on the different UE platform.

Alternatively, when the application is not available at all for the second UE, the most popular application of the same kind among other similar users may be recommended by the server app 110. For example, a checkers application may be recommended when no speed chess application is available for the second UE. The most popular application may be determined based on analyzing most downloaded or most used applications of the same kind, for example by interpreting customer reviews. That is to say, language interpretation may be used by the server app 110 to analyze user reviews of applications to decide on applications to recommend. The server app 110 may provide the second UE with the generated list of recommended applications for downloading.

The server app 110 may develop mappings of settings automatically between a source UE and a target UE based on the source UE, a source operating system platform of the source UE, the target UE, a target operating system platform of the target UE, history of user activities on the source UE, history of other users with the same model of UE as the target UE, the other users' satisfaction with UE migrations, and/or some other relevant factor. The source UE and the target UE may be the same or different models of UEs that share the same operating system platform. In other words, the source operating system platform is the same as the target operating system platform. However, the versions of the starting and target operating system platforms may be the same or different. Alternatively, the source operating system platform may be different from the target operating system platform. For example, one of the starting and target operating system platforms may be Android and the other may be iOS. Thus, the operating systems of the source UE and the target UE may be different when they are different versions of the same operating system platform or when they are simply different operating system platforms.

Different operating systems may be associated with different setting features for the same application, storage settings, or comprise other differences in settings. For example, a first version of an application in a first operating system may comprise theme, notification, and background operation options while a second version of the same application in a second operating system may comprise theme and notification options but not background operation option. As a second example, the first version of the application may store its application settings in a removable memory module such as a removable subscriber identity module (SIM) of an associated first UE while the second version of the application may store its application settings in a non-removable memory of an associated second UE. The server app 110 may generate mappings of settings between these different versions of applications. The server app 110 may also generate mappings of settings between similar applications, for example between an application stored in the data store 106 and a most used application of the same kind by other users that is recommended by the server app 110 to the second UE. The server app 110 may store the settings of the source UE in the data store 106 and may transfer the stored settings from the data store 106 to the target UE based on the mappings.

The client app 104 may store state and/or user activity history from user applications 105 to the data store 106 periodically or on events. For example, when a speed chess game is completed, the current skill level of the user and the game history may be transmitted by the client app 104 to the data store 106. When a user application 105 is selected to terminate or is turned off by the user, the client app 104 may capture and transmit the current state and user activities associated with the user application 105 to the data store 106. The server application 110 may be triggered to send the new state and/or user activities to the related user applications 105 on other UEs 102 associated with the same user. Alternatively, the server application 110 periodically shares the state and user activities among related user applications 105 on UEs 102 associated with the same user. In an embodiment, the client app 104 transcodes the state and/or user activity of user applications 105 before sending it to the data store 106, for example to a standard format. Alternatively, the server application 110 performs any transcoding of state and/or user activity data when transmitting to related user applications 105. Alternatively, related user applications 105 are able to import and transcode state and/or user activity information from other related applications.

Figure 2:
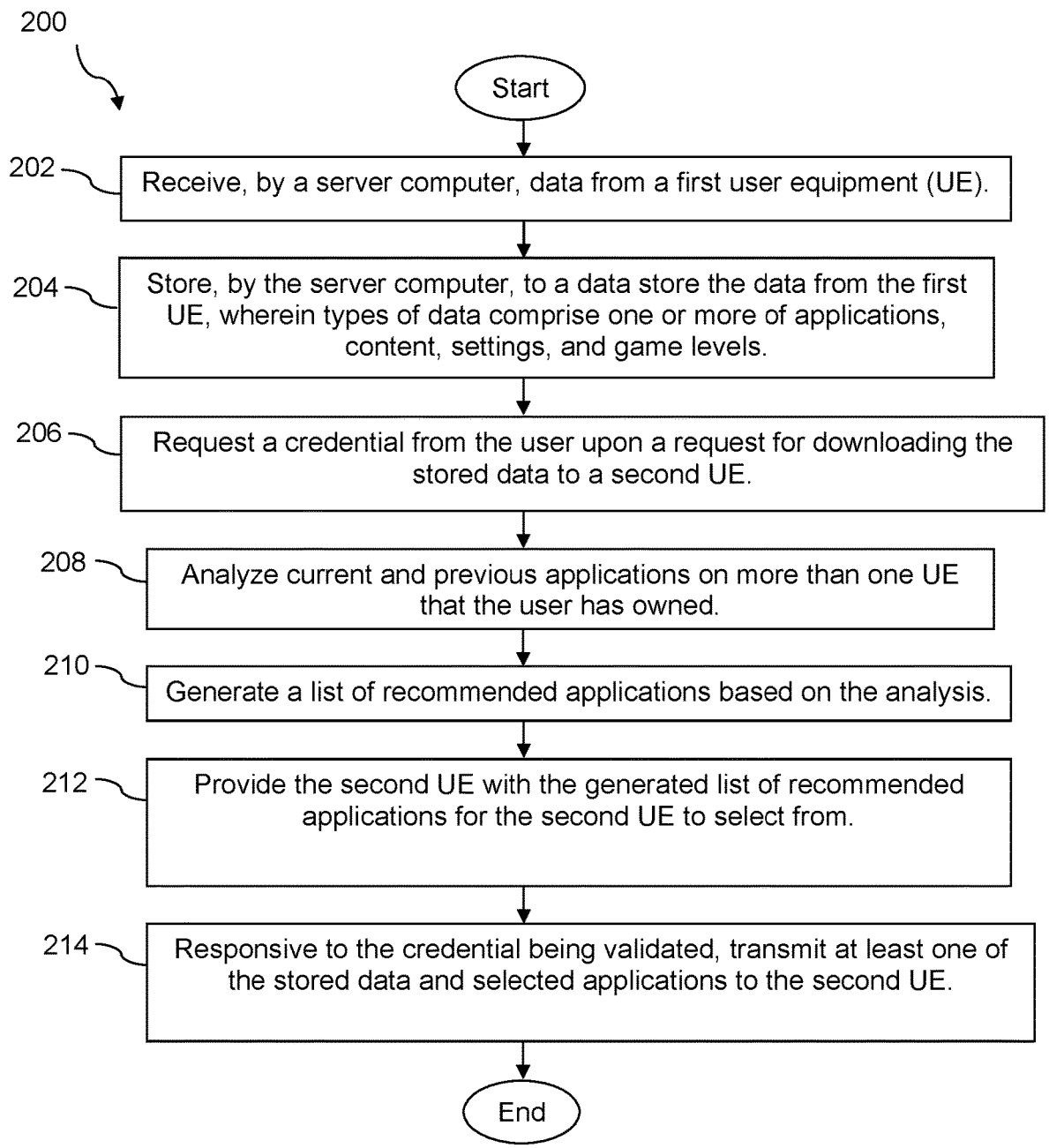
FIG. 2 is a flow chart illustrating a method according to an embodiment of the disclosure.

Turning now to FIG. 2, a method 200 is described. At block 202, data from a first UE is received by a server computer. For example, data from a first UE 102 may be received by the server 114. At block 204, the data from the first UE is stored by the server computer to a data store, wherein types of data comprise one or more of applications, content, settings, and game levels. The data from the first UE 102 may be stored by the server 114 to the data store 106. The types of data may comprise content, contacts, call logs, messages, alarms, applications, application data, game progress, settings, and/or another type of data. At block 206, a credential from the user is requested upon a request for downloading the stored data to a second UE.

At block 208, current and previous applications on more than one UE that the user has owned are analyzed. At block 210, a list of recommended applications is generated based on the analysis. At block 212, the second UE is provided with the generated list of recommended applications for the second UE to select from. At block 214, responsive to the credential being validated, at least one of the stored data and selected applications is transmitted to the second UE.

In an embodiment, at least part of the method 200 may be done during a new device activation process. For example, when the second UE is activated in a retailer store, the server 114 or the server app 110 may request a credential from the user of the second UE, analyze data on UEs 102 that the user of the second UE has owned, generate a list of recommended applications for the second UE to download based on the analysis, and/or transmit data to the second UE after the credential of the user has been verified. Alternatively, at least part of the method 200 may be triggered by new device activation. For example, when the second UE as a new device is activated, the server 114 or the server app 110 may search for data backup in the data store 106 based on the credential of the user of the second UE. When data backup for the user is found and the credential of the user is verified, the data backup may be transmitted by the server 114 to the second UE.

Figure 3:
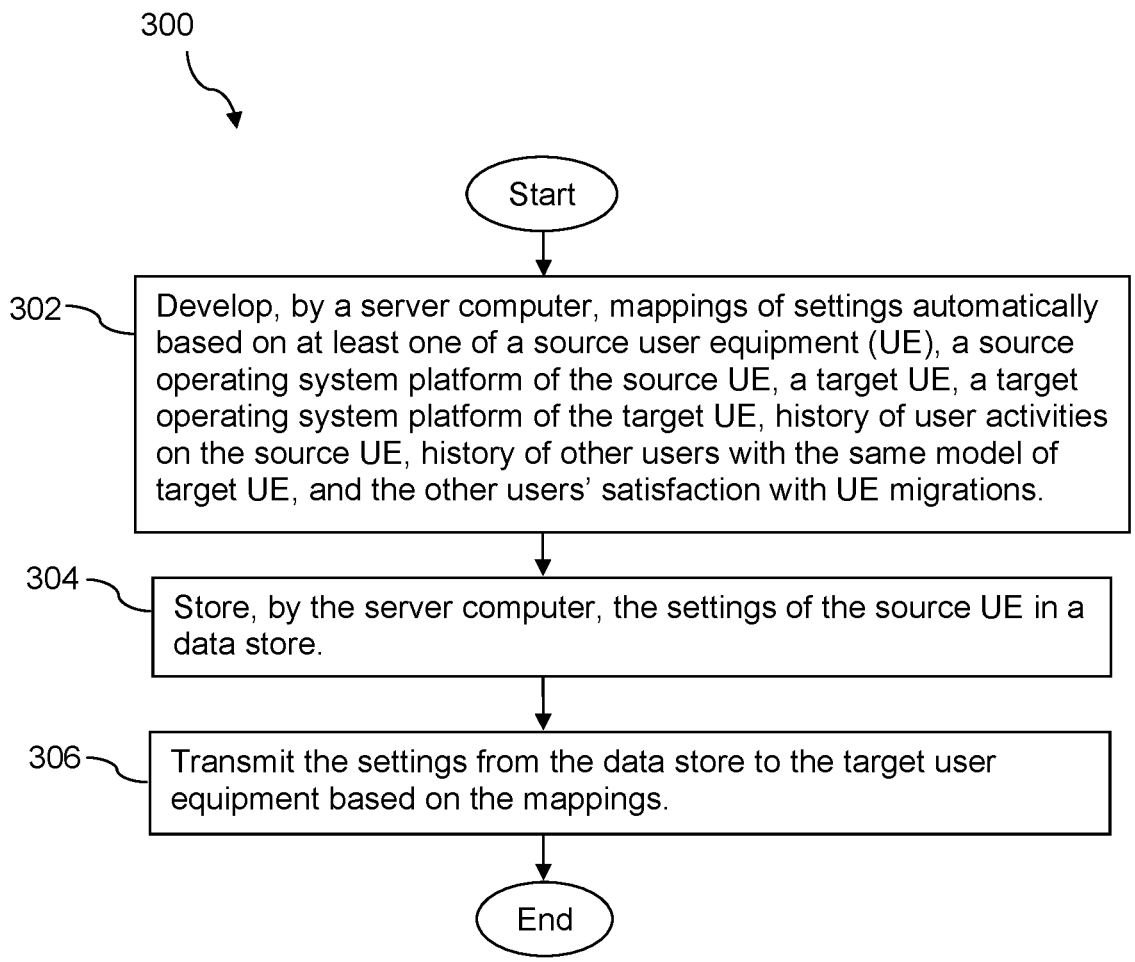
FIG. 3 is a flow chart illustrating another method according to an embodiment of the disclosure.

Turning now to FIG. 3, a method 300 is described. At block 302, mappings of settings are developed by a server computer automatically based on at least one of a source UE, a source operating system platform of the source UE, a target UE, a target operating system platform of the target UE, history of user activities on the source UE, history of other users with the same model of target UE, and the other users' satisfaction with UE migrations. For example, mappings of settings between a source UE and a target UE may be developed by the server app 110 on the server 114 based on the source UE, a source operating system platform of the source UE, the target UE, a target operating system platform of the target UE, history of user activities on the source UE, history of other users with the same model of the target UE, and the other users' satisfaction with UE migrations. At block 304, the settings of the source UE are stored by the server computer 114 in a data store 106. At block 306, the settings are transmitted from the data store 106 to the target UE based on the mappings.

Figure 4:
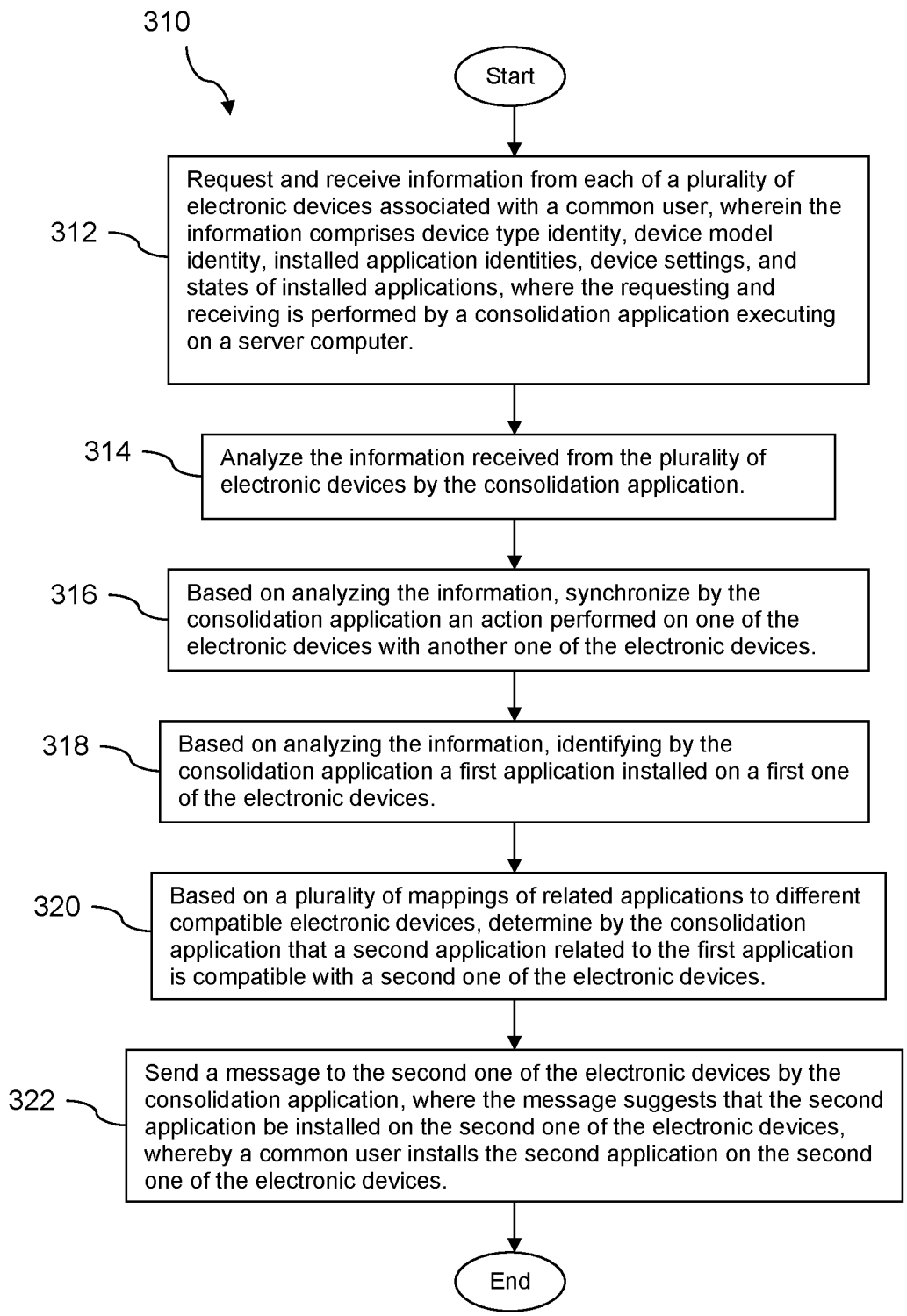
FIG. 4 is a flow chart illustrating yet another method according to an embodiment of the disclosure.

Turning now to FIG. 4, a method 310 is described. At block 312, a consolidation application executing on a server computer (e.g., sever application 110 executing on server 114) requests and receives information from each of a plurality of electronic devices (e.g., UEs 102) associated with a common user, wherein the information comprises device type identity, device model identity, installed application identities, device settings, and states of installed applications. This may comprise the server application 110 requesting the client app 104 collecting this information and transmitting it to the server application 110 and/or to the data store 106. In an embodiment, the server application 110 may receive the information by accessing it from the data store 106, for example after receiving an acknowledge message from the client app 104 or after a predefined time delay after sending the request for information to the UE 102. The server application 110 may be configured to associate a plurality of UEs 102 with the same user or service account, for example with the same subscriber to a wireless communication service. Alternatively, the association of the UEs 102 to a same user may be stored in the data store 106. While the descriptions herein discuss the processing between the server 114 and server application 110 in coordination with the processing of client apps 104 and user applications 105 on UEs 102 associated with a single common user, it is understood that the same processing is performed in support of a potentially large number of other different users, each having his or her own set of commonly owned and/or used UEs 102. For example, the system may support this processing for hundreds of thousands of users or millions of users, where each user may have a plurality of UEs 102.

At block 314, the consolidation application analyzes the information received from the plurality of electronic devices by the consolidation application. At block 316, based on the analyzing of block 314, the consolidation application synchronizes an action performed on one of the electronic devices with another one of the applications. Synchronizing action performed on one electronic device or UE with another UE may comprise sharing game levels, player skill levels, user action histories or logs, user configured settings or preferences, and other data. For example, a user speed chess game history may be synchronized from the speed chess application on a first UE to a related but possibly different speed chess application (different because possibly an earlier or later version of the same application or different because configured for execution on a different hardware platform and/or on a different operating system) on a second UE, whereby the same user may benefit from automatically enjoying a skill level of playing speed chess on whatever UE they happen to choose to play speed chess or may benefit from reviewing a speed chess game history on whatever UE they happen to choose to review the history using.

At block 318, based on the analyzing of block 314, the consolidation application identifies a first application installed on a first one of the electronic devices. At block 320, based on a plurality of mappings of related applications to different compatible electronic devices, the consolidation application determines that a second application related to the first application is compatible with a second one of the electronic devices. At block 322, the consolidation application sends a message to the second one of the electronic devices, where the message suggests that the second application be installed on the second one of the electronic devices, whereby a common user installs the second application on the second one of the electronic devices. Blocks 318, 320, 322 contemplate providing assistance to a user in identifying a related application for installation on other UEs common to the user, for example on the event of the user installing a user application 105 on one of his UEs 102. For example, when a user installs a social networking application on his mobile phone, the server application 110 detects this installation, searches for related applications, compares available related applications to the specific UEs 102 that the subject user owns or uses, and may provide a notification or message to the user on those specific UEs 102 about the available related application. For example, the user may install a professional networking application on his mobile phone that has a related application available for his tablet computer. The next time the user starts up his tablet computer, a notification pops to the screen indicating that the user can install and use the functionality of the professional networking application by installing a related application that is configured for execution on the tablet computer.

The processing of method 310 may be provided by the server application 110 and the server 114 in concert with the activity of the client app 104 on the UEs 102. The processing of method 310 may be considered to be complimentary to back-up and restore operations also managed by the client app 104 and the server application 110.

Figure 5:
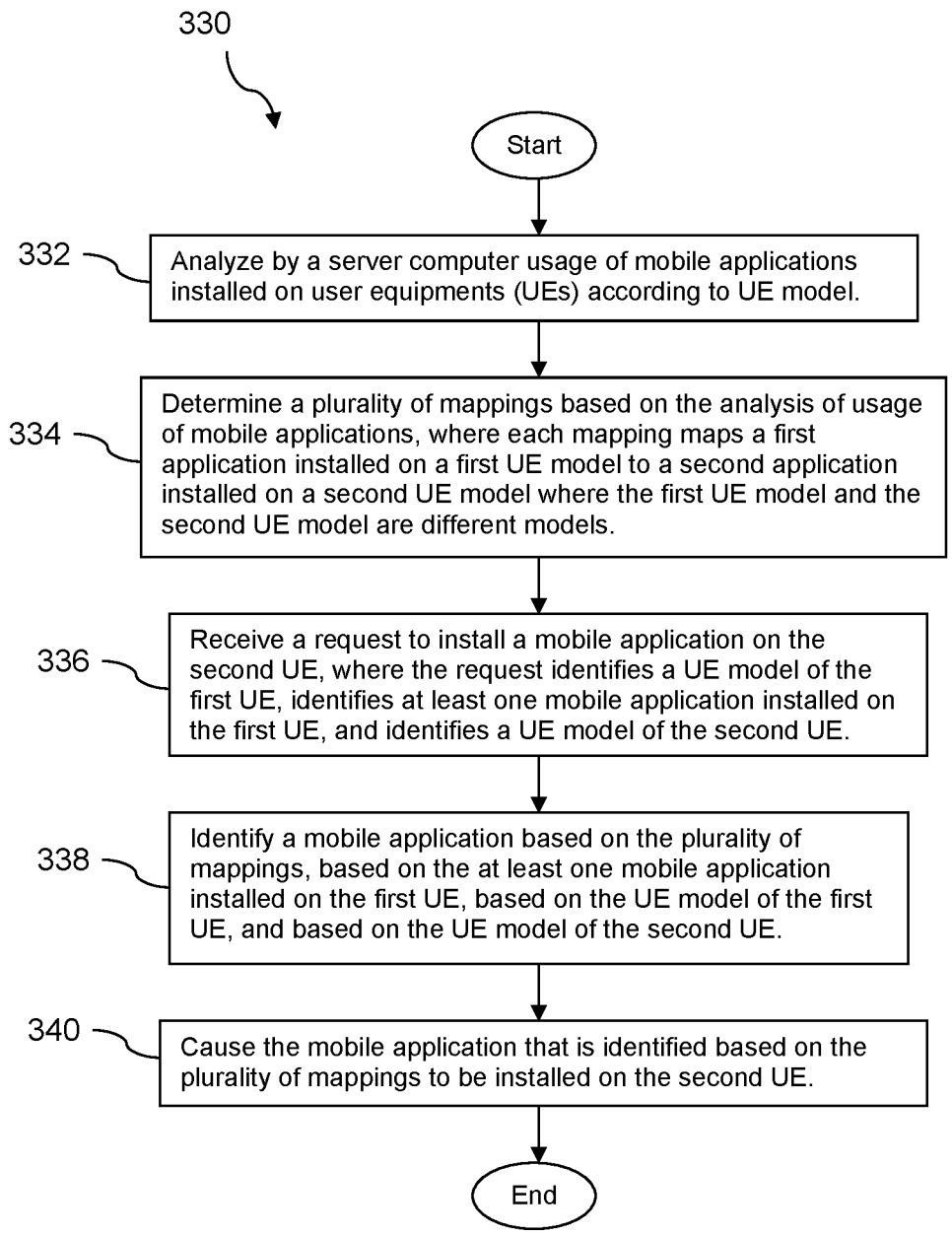
FIG. 5 is a flow chart illustrating still another method according to an embodiment of the disclosure.

Turning now to FIG. 5, a method 330 is described. At block 332, a server computer analyzes usage of mobile applications installed on UEs according to UE model. For example, the server application 110 executing on the server 114 analyzes usage of mobile applications installed on UEs 102. This analysis may be performed across a large number of UEs 102 used by a large number of unassociated users. For example, the analysis may be performed across a large number of UEs 102 that receive wireless communication service from a wireless communication service provider. The analysis may determine what user applications and versions install on what UEs 102. The analysis may determine levels of user satisfaction with the user applications and versions.

At block 334, the server computer determines a plurality of mappings based on the analysis of usage of mobile applications, where each mapping maps or associates a first application installed on a first UE model to a second application installed on a second UE model, where the first UE model and the second UE model are different models. This mapping may be considered to be a mapping of related applications and may be considered to be a bidirectional mapping. That is, speed chess application A executing on platform A is related to speed chess application B executing on platform B; correspondingly and inherently, speed chess application B executing on platform B is related to speed chess application A executing on platform A. Each mapping may identify the related applications by name and version as well as associating a specific UE model and/or version to each related application. In an embodiment, a mapping may associate more than three related applications providing similar functionality. For example 10 related speed chess applications. Alternatively, a separate mapping may be defined for every combination of two related speed chess applications.

At block 336, a request is received to install a mobile application on the second UE, where the request identifies a UE model of the first UE, identifies at least one mobile application installed on the first UE, and identifies a UE model of the second UE. At block 338, a mobile application is identified based on the plurality of mappings, based on the at least one mobile application installed on the first UE, based on the UE model of the first UE, and based on the UE model of the second UE. At block 340, the mobile application that is identified based on the plurality of mappings is caused to be installed on the second UE.

Figure 6:
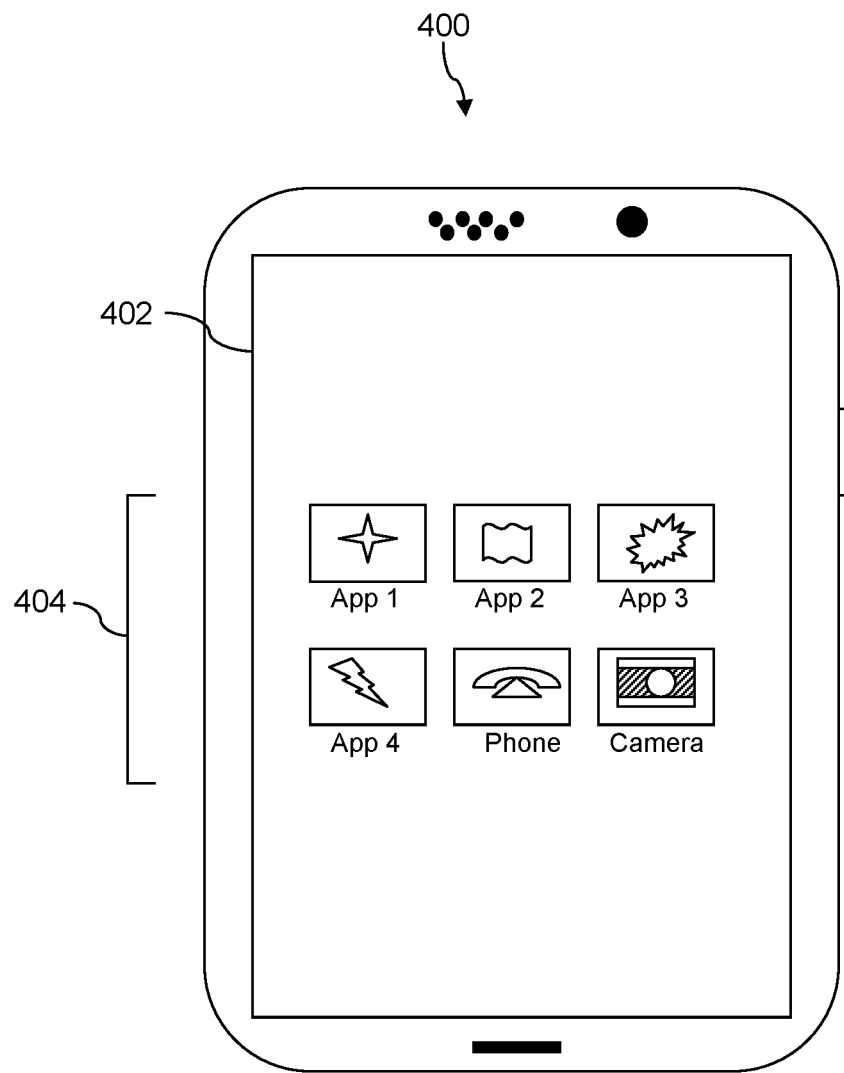
FIG. 6 is an illustration of a mobile communication device according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
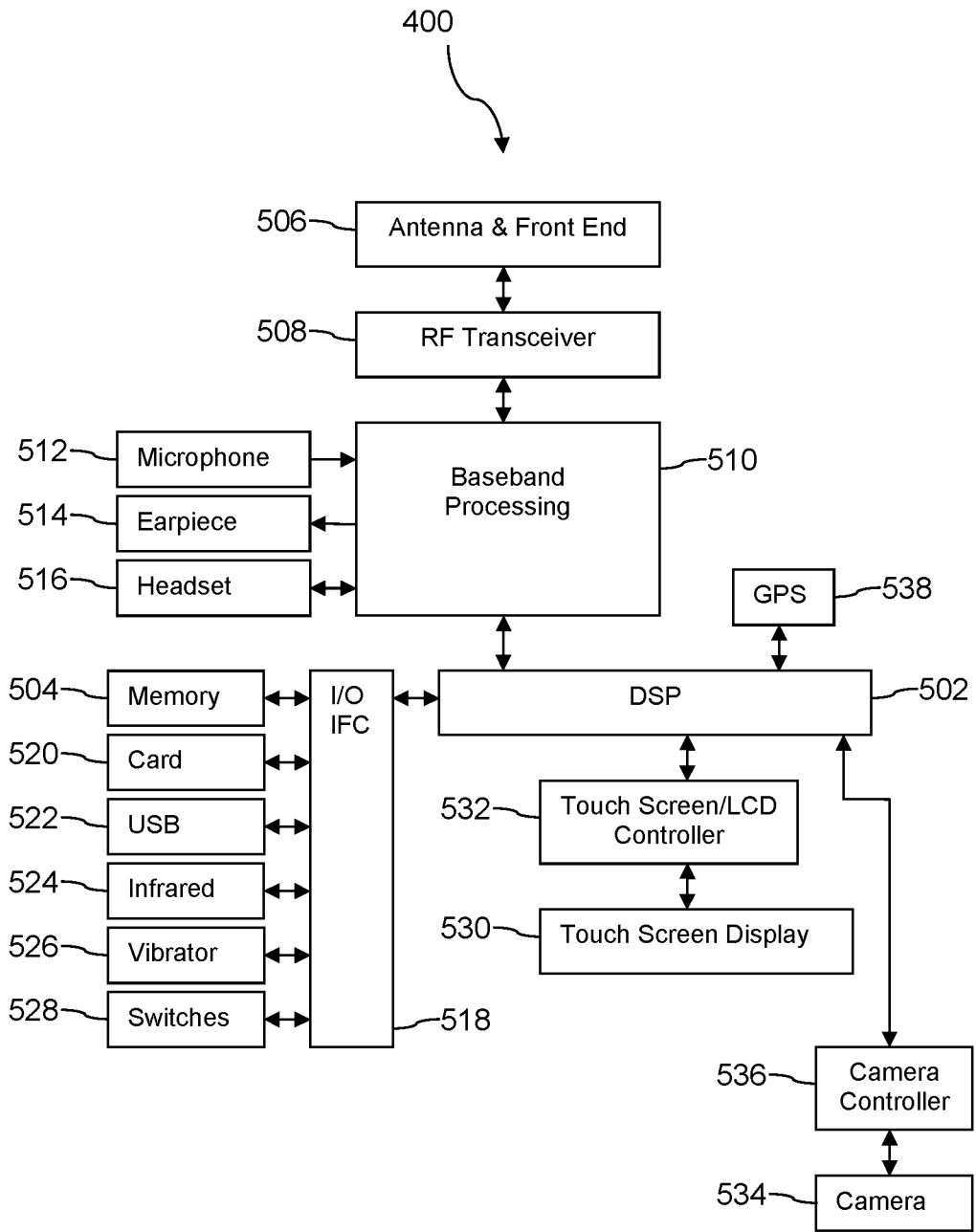
FIG. 7 is a block diagram of a mobile communication device according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
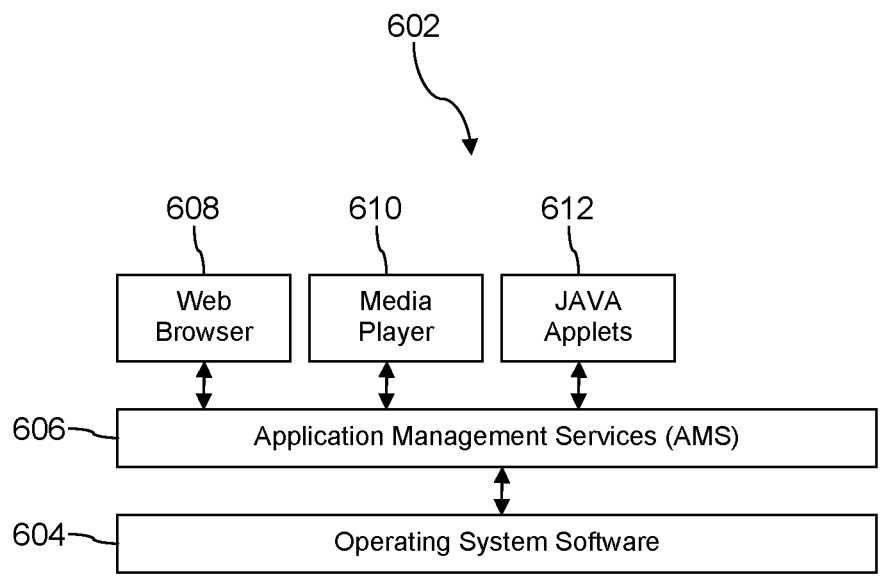
FIG. 8A is a block diagram of a software architecture of a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
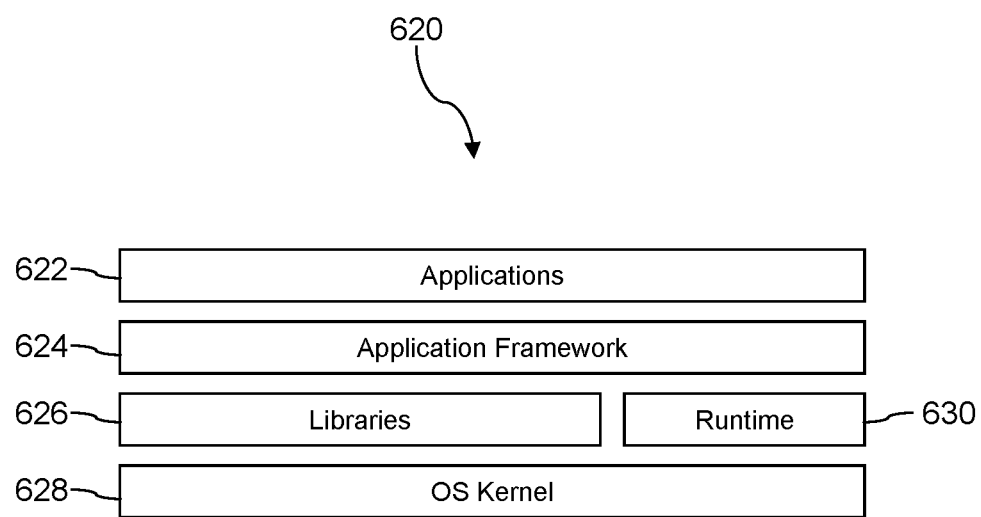
FIG. 8B is a block diagram of another software architecture of a mobile communication device according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
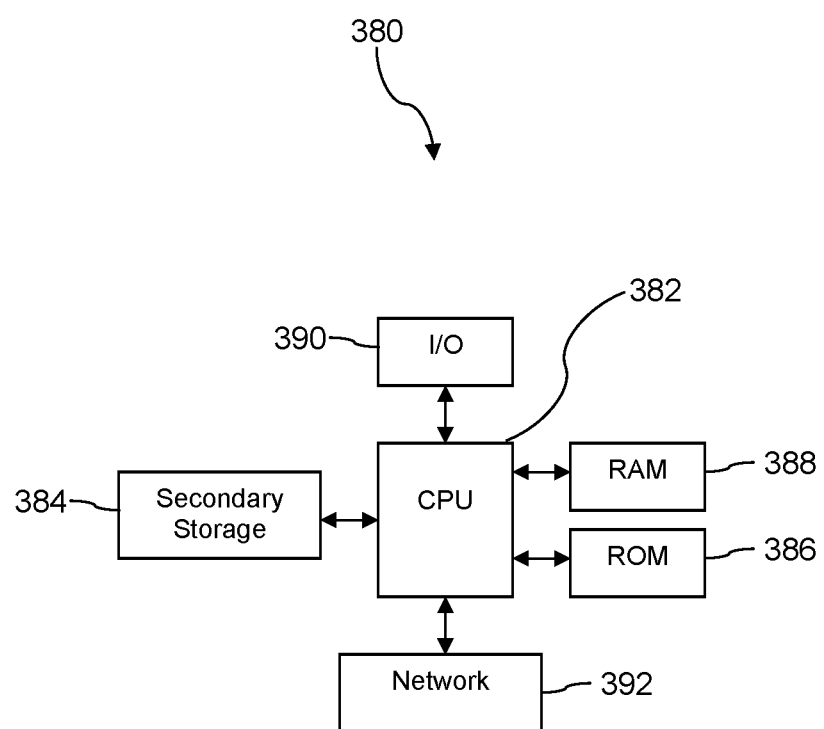
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method, comprising:
   requesting and receiving information from each of a plurality of user equipments (UEs) associated with a common user, wherein the information comprises device type identity, device model identity, installed application identities for installed applications on the plurality of UEs, device settings, and states of the installed applications, wherein the requesting and receiving is performed by a server application executing on a server computer;
   analyzing the information received from the plurality of UEs by the server application;
   based on analyzing the information, synchronizing by the server application an action performed on one of the UEs with another one of the UEs;
   based on analyzing the information, identifying by the server application a first application installed on a first one of UEs;
   based on a plurality of mappings of related applications to different compatible UEs, determining by the server application that a second application related to the first application is compatible with a second one of the UEs, wherein the first application and the second application are applications that a user interacts with, and wherein the first and second application provide a common functionality but are targeted to execute on different platforms or types of UEs;
   sending a message to the second one of the UEs by the server application, wherein the message suggests that the second application be installed on the second one of the UEs, whereby a common user installs the second application on the second one of the UEs;
   based on analyzing the information, determining by the server application that at least some applications have been downloaded to more than one of the plurality of UEs;
   during an activation process of a new UE associated with the common user, generating and transmitting by the server application a list of recommended applications to the new UE based on the determination;
   analyzing by the server application usage of mobile applications installed on user equipments (UEs) associated with different users according to UE model based on user categories of the different users;
   determining, by the server application, applications used more frequently than other applications on UEs of users associated with a same user category as a user of the new UE based on the analysis of usage, wherein users associated with the same user category share at least one common interest; and
   generating and transmitting by the server application a list of recommended applications to the new UE for the new UE to download based on the determination.

2. The method of claim 1, wherein the server application is triggered to analyze the information received from the plurality of UEs on a periodic basis.

3. The method of claim 1, further comprising receiving a message from one of the plurality of UEs indicating that a new application has been installed on the UE, wherein the server application is triggered to analyze the information received from the plurality of UEs by the message indicating that the new application has been installed.

4. The method of claim 1, wherein the plurality of UEs associated with a common user comprise three or more of a mobile phone, a personal digital assistant (PDA), a media player, a wearable computer, a headset computer, a laptop computer, a tablet computer, a notebook computer, a set-top box, and a gaming computer.

5. The method of claim 1, wherein the mappings are based in part on user feedback.

6. A method, comprising:
   requesting and receiving information from each of a plurality of user equipments (UEs) associated with a common user, wherein the information comprises device type identity, device model identity, installed application identities for installed applications on the plurality of UEs, device settings, and states of the installed applications, wherein the requesting and receiving is performed by a server computer;
   analyzing the information received from the plurality of UEs by the server computer;
   based on analyzing the information, determining by the server computer that at least some applications have been downloaded to more than one of the plurality of UEs;
   during an activation process of a new UE associated with the common user, generating and transmitting by the server computer a list of recommended applications to the new UE based on the determination;
   analyzing, by the server computer, usage of mobile applications installed on user equipments (UEs) associated with different users according to UE model based on user categories of the different users;

determining, by the server computer, applications used more than other applications on UEs of users associated with a same user category as a user of the new UE based on the analysis of usage, wherein users associated with the same user category share at least one common interest;

generating and transmitting, by the server computer, a list of recommended applications to the new UE for the new UE to download based on the determination;

determining a plurality of mappings based on the analysis of usage of mobile applications installed on UEs associated with different users, wherein each mapping maps a first application installed on a first UE model to a second application installed on a second UE model, and wherein the first UE model and the second UE model are different models;

receiving a request to install a mobile application on the new UE, wherein the request identifies a UE model of the first UE, identifies at least one mobile application installed on the first UE, and identifies a UE model of the new UE;

identifying a mobile application based on the plurality of mappings determined from the analysis of usage of mobile applications installed on UEs associated with different users, based on the at least one mobile application installed on the first UE, based on the UE model of the first UE, and based on the UE model of the new UE; and causing the mobile application that is identified based on the plurality of mappings to be installed on the new UE.

7. The method of claim 6, wherein some of the plurality of mappings map the first application installed on a first UE model having a first operating system to a second application installed on a second UE model having a second operating system, and wherein the first operating system and the second operating system are different.

8. The method of claim 6, wherein the plurality of mappings maps the first application to the second application further based on category of user, and wherein the mobile application for installation on the new UE is further identified based on a user category of the common user of the first UE and the new UE.

9. The method of claim 6, wherein the identifying a mobile application based on the plurality of mappings comprises identifying at least two mobile applications to select from to install on the new UE.

10. The method of claim 9, further comprising receiving a selection of one of the at least two mobile applications identified to select from, wherein the selected mobile application is caused to be installed on the new UE.

11. The method of claim 6, wherein the mobile application that is identified and caused to be installed on the new UE is different from the at least one mobile application installed on the first UE.

12. The method of claim 6, wherein the request to install a mobile application on the new UE further identifies a state of the mobile application installed on the first UE and the mobile application is caused to be installed on the new UE in a state that corresponds with the state of the mobile application installed on the first UE.

13. The method of claim 6, further comprising:
collecting, by a back-up application stored in a non-transitory memory of the new UE and executed by a processor of the new UE, UE data including device pairing data, alarm setting data, and mobile application state data, wherein collecting UE data comprises reading a game progress from a portion of the non-transitory memory of the new UE specifically allocated and maintained by the back-up application for use by a game mobile application to store mobile application state data; and transmitting, by the backup application, the collected UE data periodically to a remote data store via a cellular radio transceiver of the new UE, wherein transmitting the collected UE data periodically comprises transmitting the game progress from the portion of the non-transitory memory specifically allocated and maintained by the back-up application for use by the game mobile application to store mobile application state data.

14. The method of claim 13, wherein a plurality of mobile applications are stored in the non-transitory memory, and each mobile application, when executed by the processor, stores a mobile application state data associated with the mobile application in a mobile application state data region of the non-transitory memory, and wherein the mobile application state data region of the non-transitory memory is shared by the plurality of mobile applications.

15. The method of claim 14, wherein the back-up application collects the UE data by reading from the mobile application state data region of the non-transitory memory of the new UE.

16. The method of claim 13, wherein the UE data further comprises text message history data, digital image data, and call log data.

17. The method of claim 1, further comprising:
collecting, by a back-up application stored in a non-transitory memory of the new UE and executed by a processor of the new UE, UE data including device pairing data, alarm setting data, and mobile application state data, wherein collecting UE data comprises reading a game progress from a portion of the non-transitory memory of the new UE specifically allocated and maintained by the back-up application for use by a game mobile application to store mobile application state data; and transmitting, by the backup application, the collected UE data periodically to a remote data store via a cellular radio transceiver of the new UE, wherein transmitting the collected UE data periodically comprises transmitting the game progress from the portion of the non-transitory memory specifically allocated and maintained by the back-up application for use by the game mobile application to store mobile application state data.

18. The method of claim 17, wherein a plurality of mobile applications are stored in the non-transitory memory, and each mobile application, when executed by the processor, stores a mobile application state data associated with the mobile application in a mobile application state data region of the non-transitory memory, and wherein the mobile application state data region of the non-transitory memory is shared by the plurality of mobile applications.

19. The method of claim 18, wherein the back-up application collects the UE data by reading from the mobile application state data region of the non-transitory memory of the new UE.

20. The method of claim 17, wherein the UE data further comprises text message history data, digital image data, and call log data.

* * * * *